United States Patent [19]
Ficarra et al.

[11] Patent Number: 5,475,707
[45] Date of Patent: Dec. 12, 1995

[54] BROADBAND COMMUNICATIONS SYSTEM

[75] Inventors: Joseph A. Ficarra, Stonybrook; Charles Olson, Huntington Station, both of N.Y.

[73] Assignee: Westinghouse Norden Systems, Norwalk, Conn.

[21] Appl. No.: 186,407

[22] Filed: Feb. 28, 1994

[51] Int. Cl.⁶ .................................................. H04J 13/00
[52] U.S. Cl. .............................. 375/205; 380/33; 380/34; 367/117
[58] Field of Search ................................ 380/33, 34; 375/1; 367/117, 2, 3.5, 6; 370/120, 18, 19, 21

[56] References Cited

U.S. PATENT DOCUMENTS

| | | | |
|---|---|---|---|
| 3,967,066 | 6/1976 | Mathes | 380/33 |
| 4,905,221 | 2/1990 | Ichiyoshi | 370/18 |
| 4,962,488 | 10/1990 | Dell-Imagine et al. | 367/3 |
| 5,063,560 | 11/1991 | Yerbury et al. | 370/18 |
| 5,278,837 | 1/1994 | Kelley | 370/120 |
| 5,319,672 | 6/1994 | Sumiya et al. | 375/1 |

*Primary Examiner*—Tod R. Swann
*Attorney, Agent, or Firm*—C. O. Edwards

[57] ABSTRACT

A signal of bandwidth $F_{max}$ is unambiguously transmitted over a datalink having a bandwidth less than $F_{max}$ by subdividing the signal into a plurality of subspectrums and bandshifting the subspectrums greater than the datalink bandwidth to baseband. Each bandshifted subspectrum is uniquely encoded using a different pilot tone which can be detected by the receiver to decode the receive signal and unambiguously recover the narrowband spectrum components.

18 Claims, 9 Drawing Sheets

BROADBAND COMMUNICATIONS SYSTEM

TECHNICAL FIELD

This invention relates to a communication system and more particularly to a broadband communication system.

BACKGROUND ART

As information technology continues to grow, there is an ever increasing need to more efficiently utilize the bandwidth of existing systems to facilitate the transfer of narrowband information that occurs in frequency bands wider than the link bandwidth.

In the field of antisubmarine warfare the more information about a target that can transmitted to a processor in real time, the faster target detection, identification and classification can occur. Acoustic sensor improvements have steadily generated additional target information as a result of increased sensor bandwidth and the ability of the sensor to measure target bearing. However, these improvements have not been completely utilized in existing systems since the sensed acoustic signal must be electronically digitized and transmitted over a narrower bandwidth RF datalink to an aircraft containing signal processing equipment. That is, the bandwidth of the sensor is typically greater than the bandwidth of the datalink which limits the amount of sensor data that can be transmitted to the signal processing equipment in real time.

If cost was not an issue, the solution to the problem is clearly retrofitting and replacing the existing communication system with a broader band system. However, less costly subsystem improvements can be made to the communications equipment which interface sonobuoys and aircraft thus allowing the sonobuoy to transmit additional information to the aircraft in real time.

DISCLOSURE OF THE INVENTION

An object of the present invention is to provide a communications systems having the processing capability to transmit narrow band spectral components that occur in a broad bandwidth signal over a narrower bandwidth datalink.

Another object of the present invention is to provide a communications system having the ability to utilize an available fixed bandwidth datalink to transmit narrowband information occurring in a broader bandwidth signal over the datalink in real-time.

Yet another object of the present invention is to provide a communications systems which allows a sonobuoy to transmit narrowband data occurring in bandwidth $F_{max}$ over a datalink having a bandwidth less than $F_{max}$.

According to the present invention, narrowband frequency components of information within a data signal of bandwidth $F_{max}$, are unambiguously transmitted over a datalink having a bandwidth less than $F_{max}$ by subdividing the data signal into a plurality of subspectrums and bandshifting the subspectrums containing narrowband frequency components of information down to baseband; a unique pilot tone is added to each bandshifted subspectrum and the subspectrums are each modulated by pseudo random bipolar noise coded signals, summed together to create a single data signal and transmitted over the datalink to a receiver; the receiver decodes the received data signal to recover the narrowband frequency components by demodulating the received data signal using the noise coded signal and synchronizing the receiver and the transmitter by detecting the pilot signals in the spectra of the demodulated signal; the demodulated signals are then processed by a spectrum analysis system.

The present invention allows the unambiguous transmission of narrowband information occurring over a broadband spectrum over a datalink whose bandwidth is less the bandwidth of the broadband spectrum. The present invention may be particularly useful in the field of the antisubmarine warfare where sonobuoys transmit information (e.g., angle channel bearing) over a radio datalink to on-site aircraft. The present invention provides a subsystem improvement to the sonobuoy-to-aircraft communications system which allows a sonobuoy to unambiguously transmit acoustic data over a datalink having a bandwidth less than the bandwidth over which the acoustic data transmitted is acquired. The subsystems improvements involve adding signal processing functions to both the receiver and transmitter of the communications system, which allows the system to process and unambiguously recover information from a much wider band, but still utilize the same communication channel bandwidth. Equipment that was designed with a fixed bandwidth can now process and recover information from a much wider band, but still operate within the existing fixed band communication channel. In the field of direction finding, the present invention allows systems using the goniometer principle to add additional channels (e.g., sine and cosine channels) to the existing omnidirectional channel without increasing the bandwidth of the RF communication channel.

Narrowband signals located in bandwidth $F_{max}$ can be unambiguously transmitted over the datalink having a bandwidth less than $F_{max}$, by subdividing the $F_{max}$ spectrum into a plurality of subspectrums and bandshifting the subspectrums greater than the datalink bandwidth to baseband. Each bandshifted subspectrum is uniquely encoded using a different pilot tone which is detected by the receiver to decode the receive signal and recover narrowband frequency components indicative of the acoustic information over the entire $F_{max}$ bandwidth of the data signal.

The present invention trades signal-to-noise ratio for additional bandwidth. That is, the present invention makes it possible to transmit signals spread over a bandwidth in a narrower bandwidth datalink, as long as there is sufficient signal-to-noise ratio.

These and other objects, features and advantages of the present invention will become more apparent in light of the following detailed description of a preferred embodiment thereof, as illustrated in the accompanying drawings.

BEST MODE FOR CARRYING OUT THE PRESENT INVENTION

Figure 1:
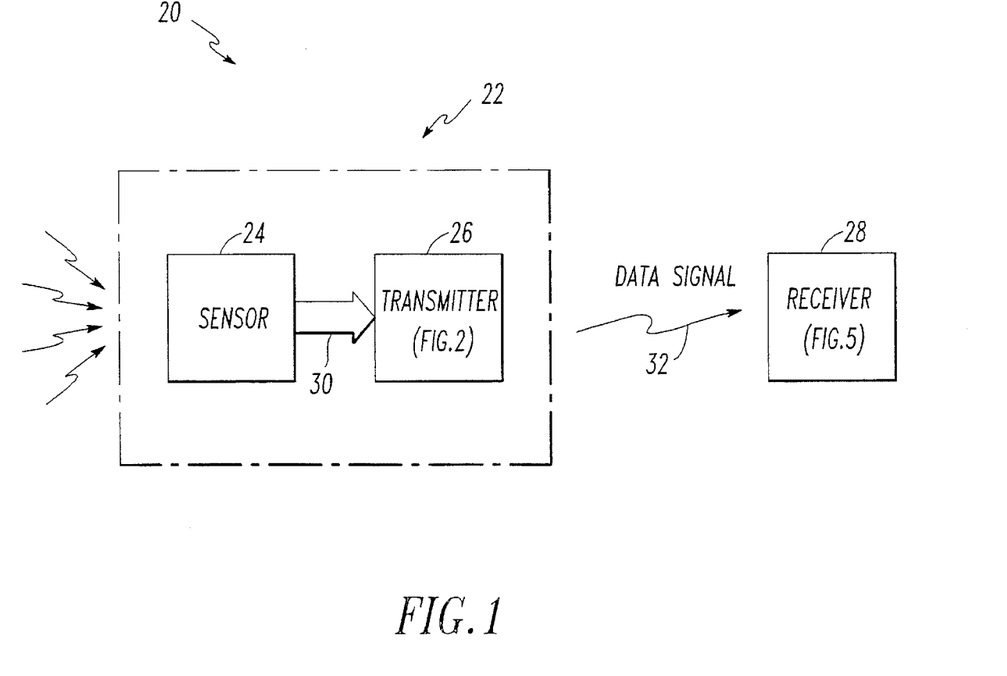
FIG. 1 is a top level functional block diagram of a broadband communications system containing a transmitter and receiver.

Referring to FIG. 1, a broadband spectrum communications datalink 20 includes a transmit unit 22 having a sensor 24 and a transmitter 26 which transmits data to a receiver 28. The sensor 24 (e.g., acoustic, RF, electromagnetic, etc. . . . ) provides a captured signal on a line 30 to the transmitter 26 which processes the captured signal and transmits it real time to the receiver 28. In one embodiment the transmit unit 22 may represent a sonobuoy which detects acoustic noise propagating in water and transmits an RF signal 32 indicative of the acoustic noise to the receiver 28 located in an aircraft (not shown). As discussed hereinbefore, a problem with prior art systems is the limited spectral bandwidth of the datalink limits the bandwidth of data that can be transmitted.

Figure 2:
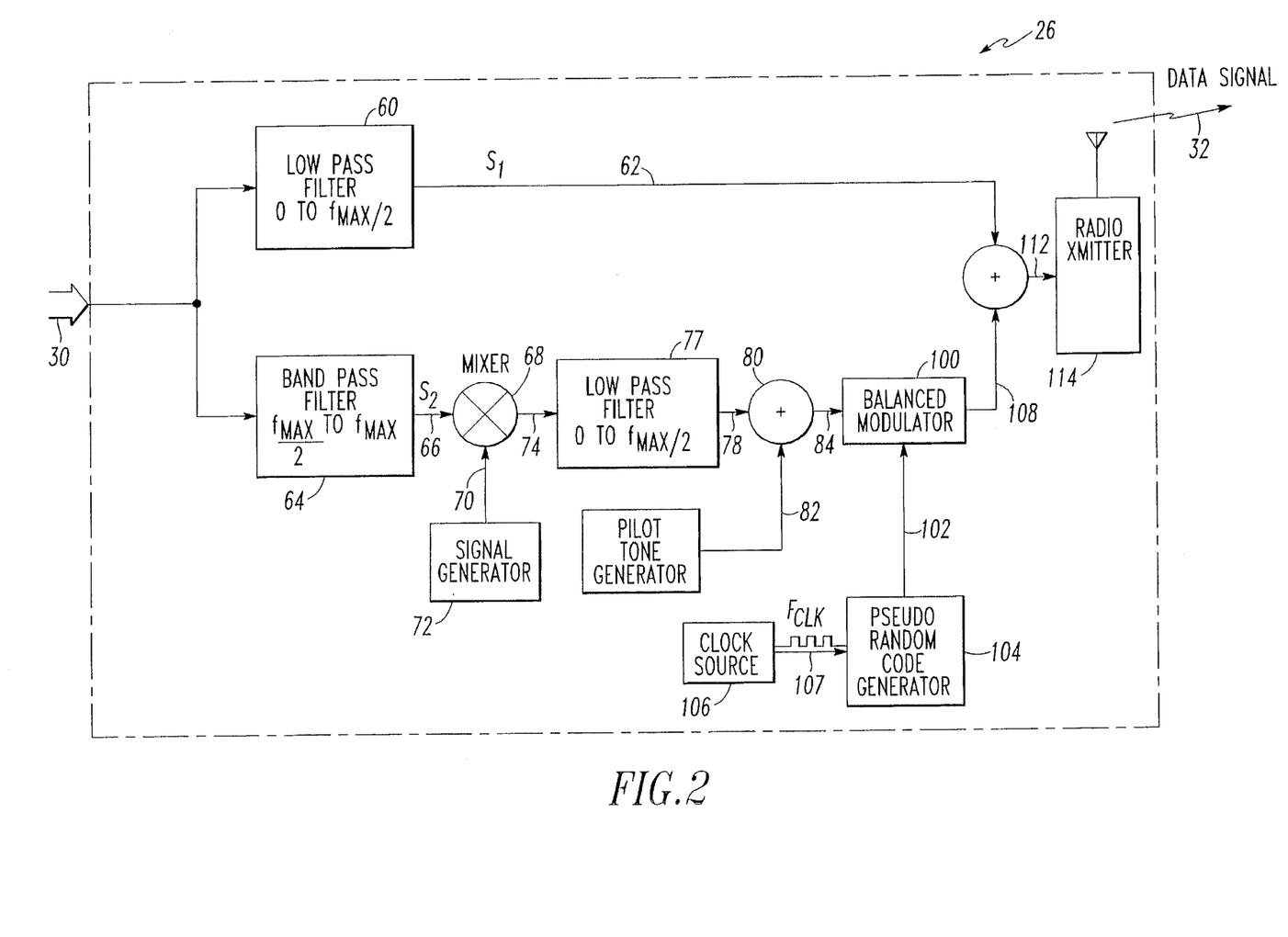
FIG. 2 illustrates a functional block diagram of the transmitter within the broadband communications system of FIG. 1.
Figure 3A:
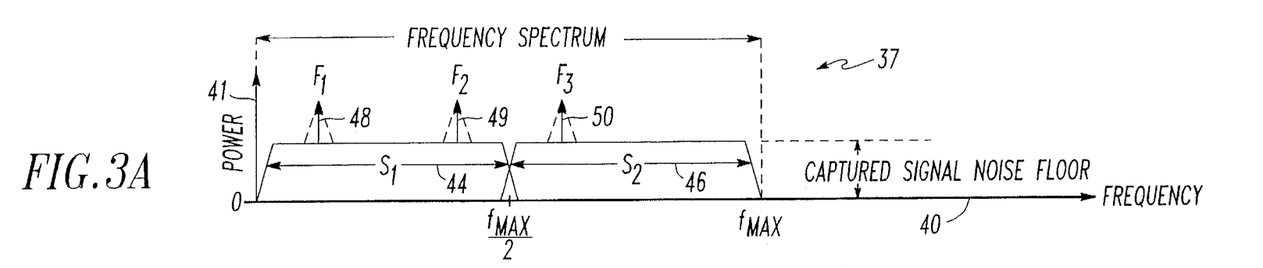
FIGS. 3(A)–3(G) illustrate frequency domain plots of various system signals.

Referring to FIG. 2, the transmitter 26 receives the captured signal on the line 30 whose frequency spectrum contains narrowband frequency components of information indicative of the status (e.g., position and range) of objects detected by the sensor 24 (FIG. 1). FIG. 3(A) illustrates a plot 39 of the frequency spectrum for the captured signal on the line 30. Frequency is plotted along a horizontal axis 40 and power is plotted along a vertical axis 41. The frequency spectrum 42 has a bandwidth $F_{max}$ (e.g., several hundred KHz) which can be subdivided and represented in terms of a lower spectrum $S_1$ 44 and an upper spectrum $S_2$ 46. In the interest of clarity, the bandwidth of the captured signal is assumed to be twice the bandwidth of the transmitter/receiver pair which allows the frequency spectrum 42 to divided into two subspectrums. As an example the lower spectrum $S_1$ 44 may range in frequency from about zero to $F_{max}/2$ Hertz, while the spectrum of $S_2$ may run from $F_{max}/2$ to $F_{max}$ Hertz. The sum (in the frequency domain) of the lower spectrum $S_1$ 44 and the upper spectrum $S_2$ 46 is the frequency spectrum 42 of the captured signal. Within the spectrum 42 of the captured signal are narrowband frequency components $F_1, F_2$ and $F_3$ 48–50 respectively which represent target information (i.e., acoustic noise) from the sensor 24. As an example, the frequency components $F_1, F_2, F_3$ 48–50 may represent detected acoustic noise from rotating machinery.

Referring now to FIGS. 2–3, the transmitter 26 routes the captured signal on the line 30 to a low pass filter (LPF) 60 which attenuates frequency components above $F_{max}/2$ to ideally provide a signal on a line 62 whose spectrum is indicative of $S_1$ 44. The LPF 60 is preferably a multi-pole filter (e.g., two or more poles) to ensure adequate attenuation of the frequency components greater than $F_{max}/2$. A butterworth filter is preferred due to its inherently flat response in the passband.

The captured signal on the line 30 is also input to a band pass filter (BPF) 64 having a passband from $F_{max}/2$ to $F_{max}$. The BPF 64 preferably has several poles and zeros to ensure adequate signal attenuation outside the desired passband. The BPF 64 provides a band passed signal on a line 66 which is indicative of the upper spectrum $S_2$ 46.

Figure 3B:
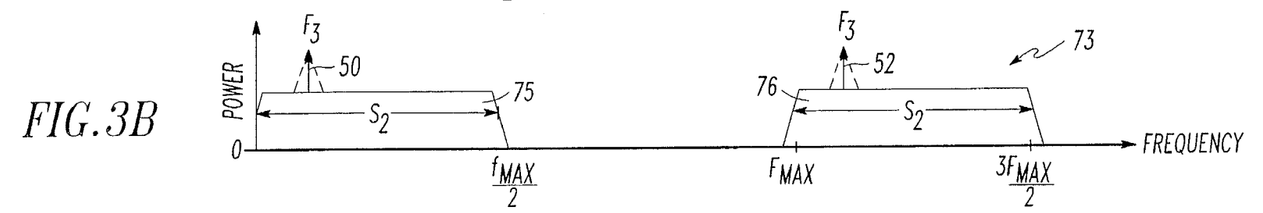
Figure 3C:
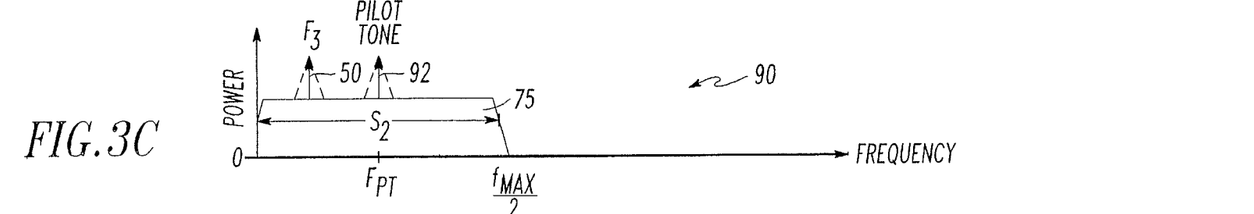

The band passed signal on the line 66 is input to a mixer 68 which in a well known manner mixes the band passed signal and a mixing signal on a line 70 from a signal generator 72. The mixing signal can be a sine or cosine waveform having a frequency value selected to bandshift the subspectrum $S_2$ 46 to baseband which is the bandwidth of the datalink 20 (i.e., zero to $F_{max}/2$ Hertz). In the present example the frequency value of the mixing signal is preferably $F_{max}/2$. The mixer 68 provides a beaten signal on a line 74 which contains sum and difference frequency components caused by beating the signals on lines 66 and 70 together. FIG. 3(B) is a frequency domain plot 73 of the beaten signal on the line 74. The spectrum contains a difference spectrum 75 and a sum spectrum 76 which each contain information identical to the signal on the line 66. Since the difference and sum spectrums are identical, the signal on the line 74 is input to a low pass filter (LPF) 77 which attenuates the sum spectrum 76. The break frequency of the LPF 77 is set at $F_{max}/2$ and the filter provides a bandshifted signal on a line 78 containing the subspectrum $S_2$ bandshifted to baseband. A summing function 80 sums together the bandshifted signal and a tone signal of frequency value $F_{PT}$ on a line 82 to provide a summed signal on a line 84. The tone signal is later used as a synchronization signal during the receive processing which shall be discussed in detail hereinafter. FIG. 3(C) illustrates a plot 90 of the frequency spectrum for the summed signal on the line 84. Frequency is plotted along the horizontal axis and power is plotted along the vertical axis. The spectrum of the summed signal is essentially the same as the spectrum $S_2$ 46 (FIG. 3A) with the exception that the spectrum has been bandshifted to baseband and the pilot tone signal 92 added.

A balanced modulator 100 modulates the summed signal on the line 84 with a bi-polar pseudo random noise (PRN) signal on a line 102. The noise signal is created by a pseudo random code generator 104 driven by a clock signal source 106 which generates a periodic drive signal on a line 107 at a frequency value $F_{clk}$ (e.g., 10 KHz), where $F_{clk} \ll F_{max}$.

Figure 4:
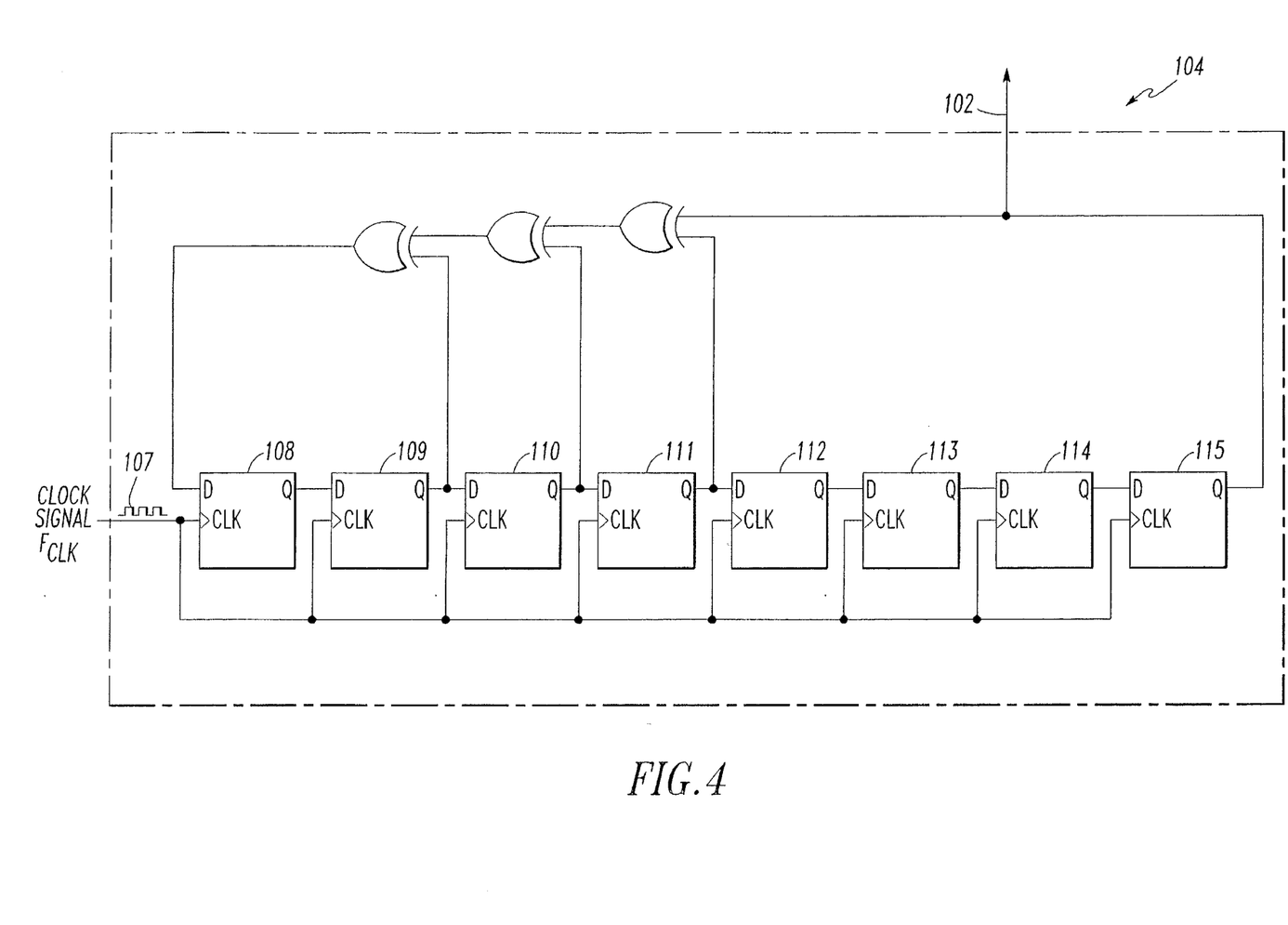
FIG. 4 illustrates a functional block diagram of a pseudo random number generator used in the transmitter of FIG. 2.

FIG. 4 illustrates a block diagram of an 8-bit pseudo random code generator 104 capable of generating a sequence of 255 pseudo random numbers before the sequence repeats. The generator 104 includes eight flip-flops 108–115 configured as a shift register operating at a rate set by the clock signal on the line 107. The generator 104 is not limited to eight bits. The generator can be expanded to provide longer pseudo-random sequences my adding more flip-flops where each additional flip-flip increases the sequence length by a power of two (i.e., the pseudo random sequence is $2^N-1$ long where N is the number of flip-flips in the shift register chain). During power-up each flip-flop comes up in a random state (i.e., on or off) which is the starting point for the sequence.

Figure 3D:
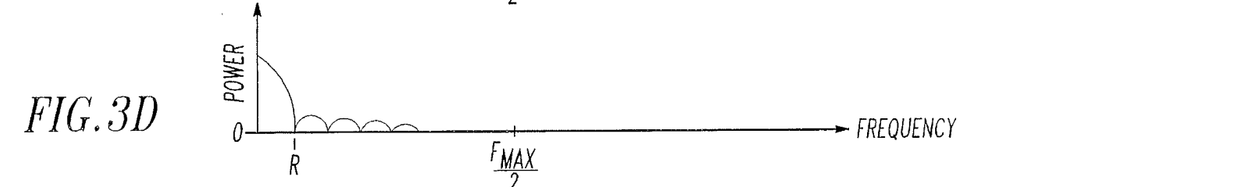

FIG. 3(D) is a frequency domain plot of the pseudo random noise signal on the line 102. Frequency is plotted along the horizontal axis and power is plotted along the vertical axis. The spectrum of the noise signal is essentially a SINC function (i.e., Sin (x)/x) where R represents the number of bits per second the generator 104 operates at.

Figure 3E:
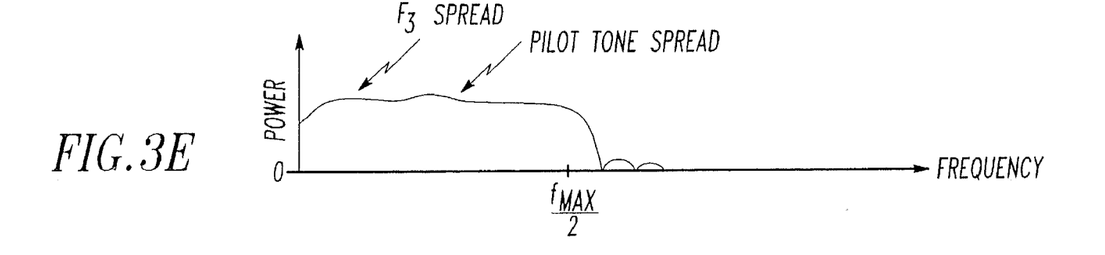

Referring back to FIGS. 2–3, the modulator 100 provides a modulated signal on a line 108 which is summed with the signal on the line 62 to create a composite signal that is transmitted by an RF transmitter 114 having a bandwidth $F_{max}/2$. FIG. 3(E) illustrates a frequency domain plot of the signal on the line 108. Note, the power associated with both narrowband frequency component $F_3$ 50 and the pilot tone 92 has been spread within the frequency spectrum of the composite signal by the modulator 100.

Figure 3F:
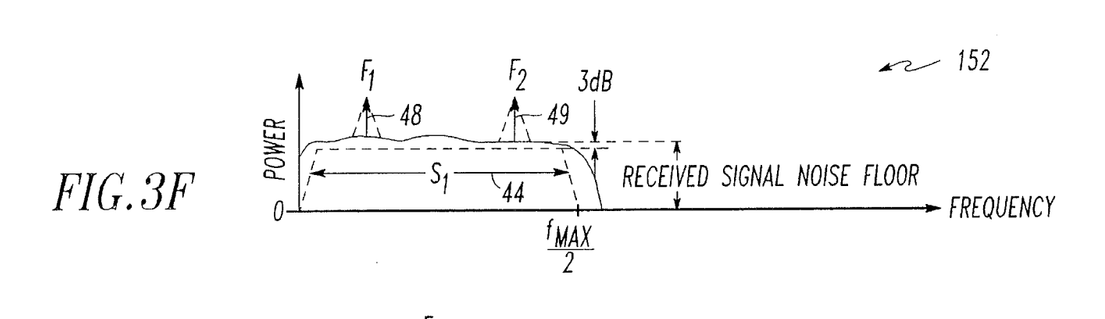
Figure 5:
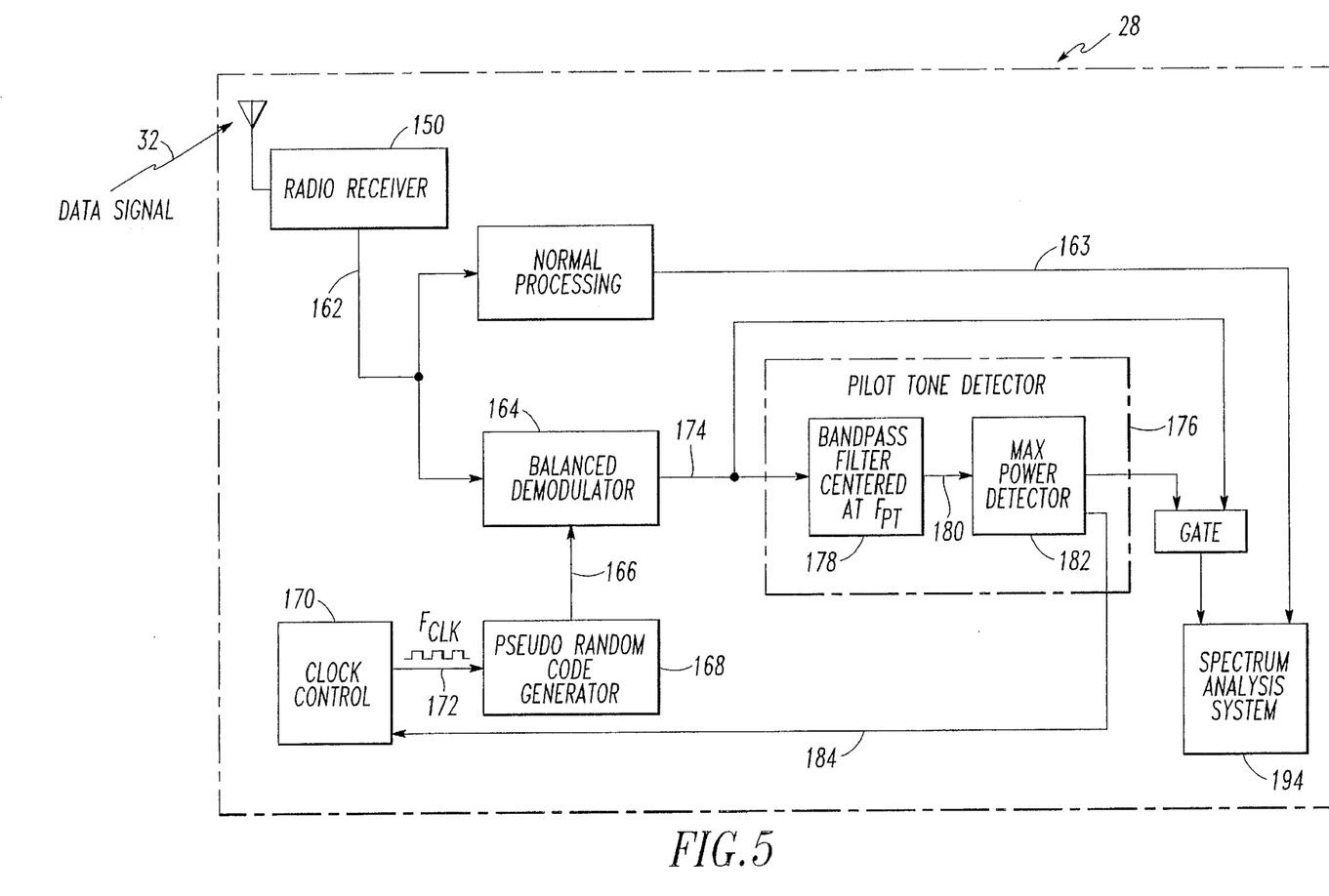
FIG. 5 illustrates a functional block diagram of the receiver within the broadband communications system of FIG. 1.

Referring to FIG. 5, the receiver 28 operates within the frequency spectrum of zero to $F_{max}/2$ Hertz and receives the data signal 32 containing the narrowband frequency components of information within subspectrums $S_1$ and $S_2$ via a radio receiver 150. FIG. 3(F) illustrates a frequency domain plot 152 of the data signal which is the sum of the subspectrum $S_1$ and the bandshifted and modulated subspectrum $S_2$. The spectrum 153 of the data signal includes narrowband components $F_1, F_2$ 48,49 respectively, along with the energy from $F_3$ 52 and the pilot tone 92 the power of both of which have been spread across the spectrum by modulator 100 (FIG. 2). Note, as a point of comparison the subspectrum $S_1$ 44 is illustrated by dashed lines within the spectrum of the received signal. In general, assuming the same power levels for the noise floors of $S_1$ and $S_2$, the noise floor of the received signal will be about 3 dB above the noise floor of the data signal due to the bandshifting and the summing.

Referring FIGS. 3 and 5, the radio receiver 150 provides a digitized received signal on a line 162 which is indicative of the data signal 32. The received signal is processed along two paths to recover the narrowband frequency components $F_1, F_2$ and $F_3$ 48–50 respectively within $S_1$ and $S_2$. The first path recovers components $F_1, F_2$ 48,49 within subspectrum $S_1$ using conventional techniques such as threshold detection, and provides a recovered signal indicative of the information within the subspectrum $S_1$ on a line 163. The second path recovers narrowband frequency component $F_3$ 50 located within subspectrum $S_2$ 46 by demodulating the received signal with a pseudo random noise coded signal on a line 166 from a code generator 168. The code generator 168 is similar to the transmitter code generator 104 (FIG. 2) and is driven by a clock circuit 170 which provides a clock signal on a line 172 operating at the same speed as the transmitter clock signal on the line 107 (FIG. 2). In addition, the receiver's pseudo random noise signal on the line 166 uses the same sequence as the transmitter's pseudo random noise signal on the line 102 (FIG. 2).

To accurately recover narrowband frequency component $F_3$ 50 within the spectrum of the received signal on the line 162, the receiver's pseudo random noise signal must be aligned in time (i.e., synchronized) with transmitter's pseudo random noise signal. Synchronization can be performed by demodulating the received signal on the line 162 and comparing the power located at the pilot tone frequency value $F_{PT}$ within the spectrum of the demodulator output signal on a line 174. This detection technique is premised on the fact that when the receiver and transmitter pseudo random noise signals are synchronized, the energy associated with the frequency component at the pilot tone frequency value $F_{PT}$ within the demodulator output signal spectrum reaches a maximum. To perform the detection, a pilot tone detector 176 includes a narrow passband filter 178 centered about the pilot tone frequency value $F_{PT}$. The filter 178 provides a filtered signal on a line 180 indicative of the power at the pilot tone frequency value $F_{PT}$, and max power detector 182 determines if maximum power has been achieved. To find max power, the detector 182 compares the past value of the demodulator output signal and the present value of the demodulator output signal. If the present value is less than the past value, the max power peak has just been passed. However, if the power of the present value is greater than the power of the past value, the detector 182 issues a delay signal on a line 184 the value of which is indicative of the amount of time the detector 182 commands the clock control 170 to delay issuing clock pulses. Once the delay is complete, the received signal is again demodulated and the power of the frequency component $F_{PT}$ is again compared to determine if max power has been reached. This process continues until max power is detected indicating the transmitter and receiver are synchronized. In general, synchronization may only need to be performed during system initialization or when system built-in-test (BIT) determines that synchronization has been lost.

Figure 3G:
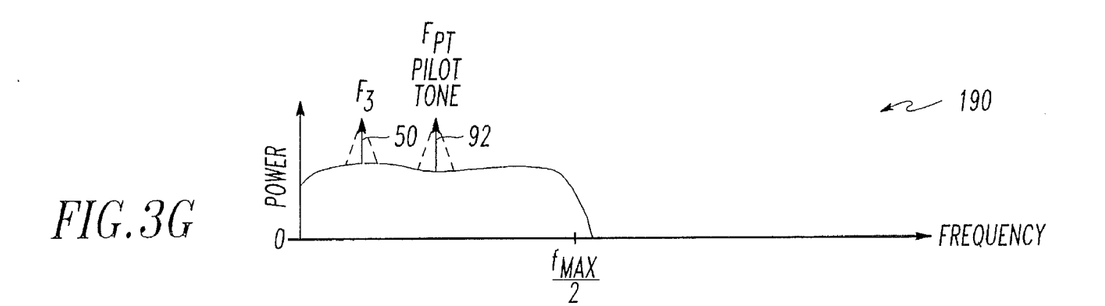

Once synchronization is completed, the demodulator output signal on the line 174 contains valid spectral data indicative of the spectrum $S_2$, thus allowing the receiver 28 to recover the narrowband frequency component $F_3$. FIG. 3(G) illustrates a frequency domain plot 190 of the demodulator output signal on the line 174. The spectrum is essentially the $S_2$ subspectrum bandshifted to baseband and having about 3 dB more flat noise as compared to the noise floor of the captured signal on the line 30 (see FIG. 3(B)). The demodulated signal on the line 174 is then multiplexed into a signal analyzer 194 which in a well known manner analyzes the spectral content of the demodulated signal to determine the characteristics of the detected targets. As an example, the signal analyzer 194 will process the signal on the line 163 to detect narrowband frequency components $F_1, F_2$ 48,49 and process the signal on the line 174 to detect bandshifted narrowband frequency component $F_3$ 50. The analyzer will then add $F_{max}/2$ to the frequency value of the bandshifted $F_3$ frequency value to arrive at the proper frequency value for $F_3$. In general, the analyzer 194 may contain a multichannel narrowband spectrum analyzer employing digital FFT processing techniques to detect the frequency components within the $S_1$ and $S_2$ subspectrums associated with valid target information (i.e., acoustic noise from rotating machinery).

Figure 6:
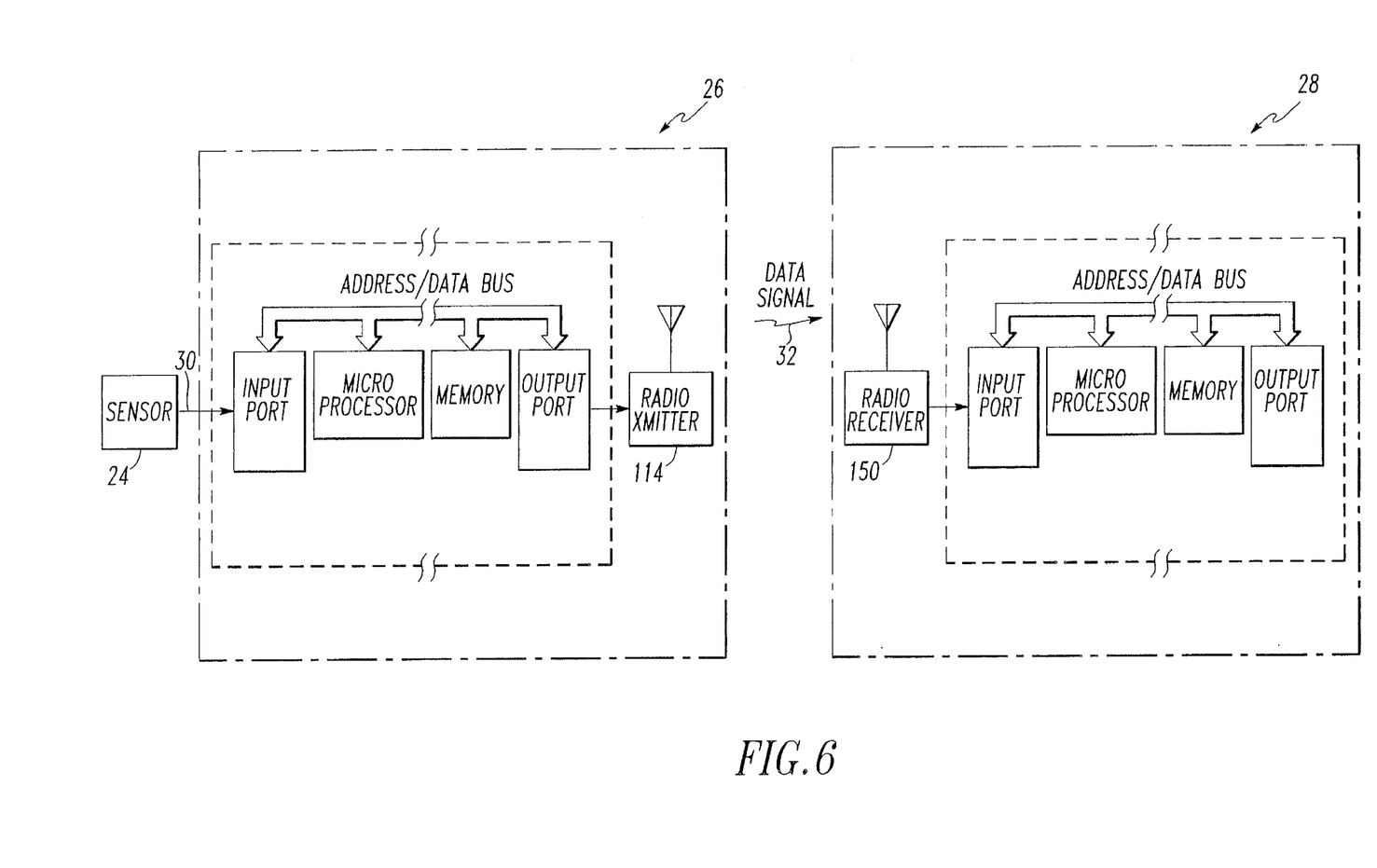
FIG. 6 illustrates a functional block diagram of a microprocessor based discrete time embodiment of the present

In a preferred embodiment, the processing of the present invention occurs in the discrete time domain due to the inherent advantages of digital signal processing systems over analog processing. FIG. 6 illustrates a functional block diagram of a microprocessor based transmitter 26 and a microprocessor based receiver 28. The transmitter 26 and the receiver 28 each include a microprocessor (e.g., Intel 80486, Motorola 68030 or a RISC processor such as the Texas Instruments TMSC325), memory (e.g., RAM, PROM and EEPROM) and input/output ports. Each microprocessor should have sufficient speed and processing ability to handle real-time data processing. Depending on the input signals, the input ports may include an analog-to-digital converter, a frequency-to-digital converter, or any such other signal conditioning functions known to those skilled in the art as being required to transform input signals to digital signal format. Similarly the output port will include any such signal processing functions required to transform digital signals to a format (analog or digital) compatible with the systems which utilize information from the receiver 28.

Figure 7:
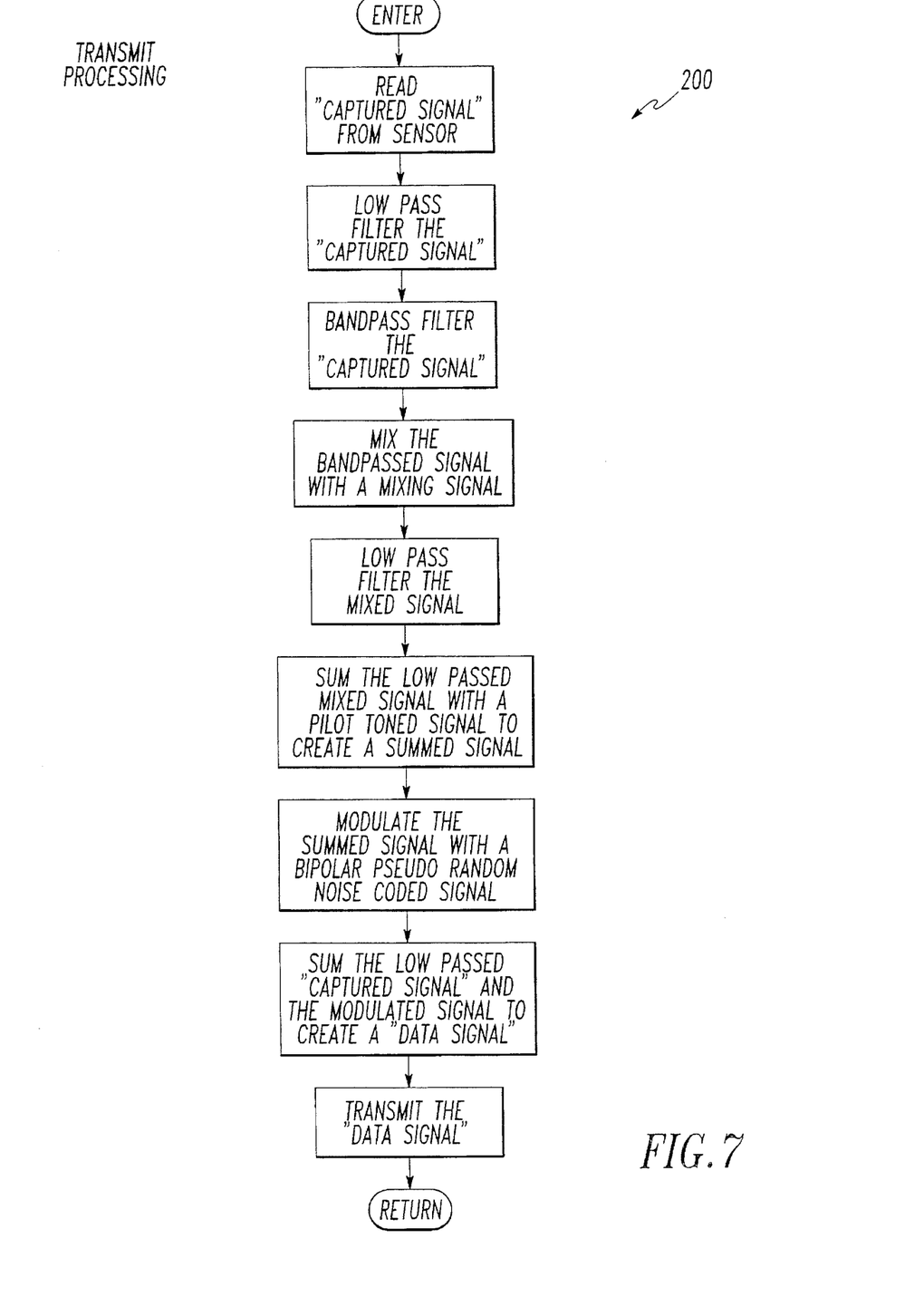
FIG. 7 is a flowchart diagram illustrating execution of the transmitter signal processing functions disclosed in FIG. 2.
Figure 8:
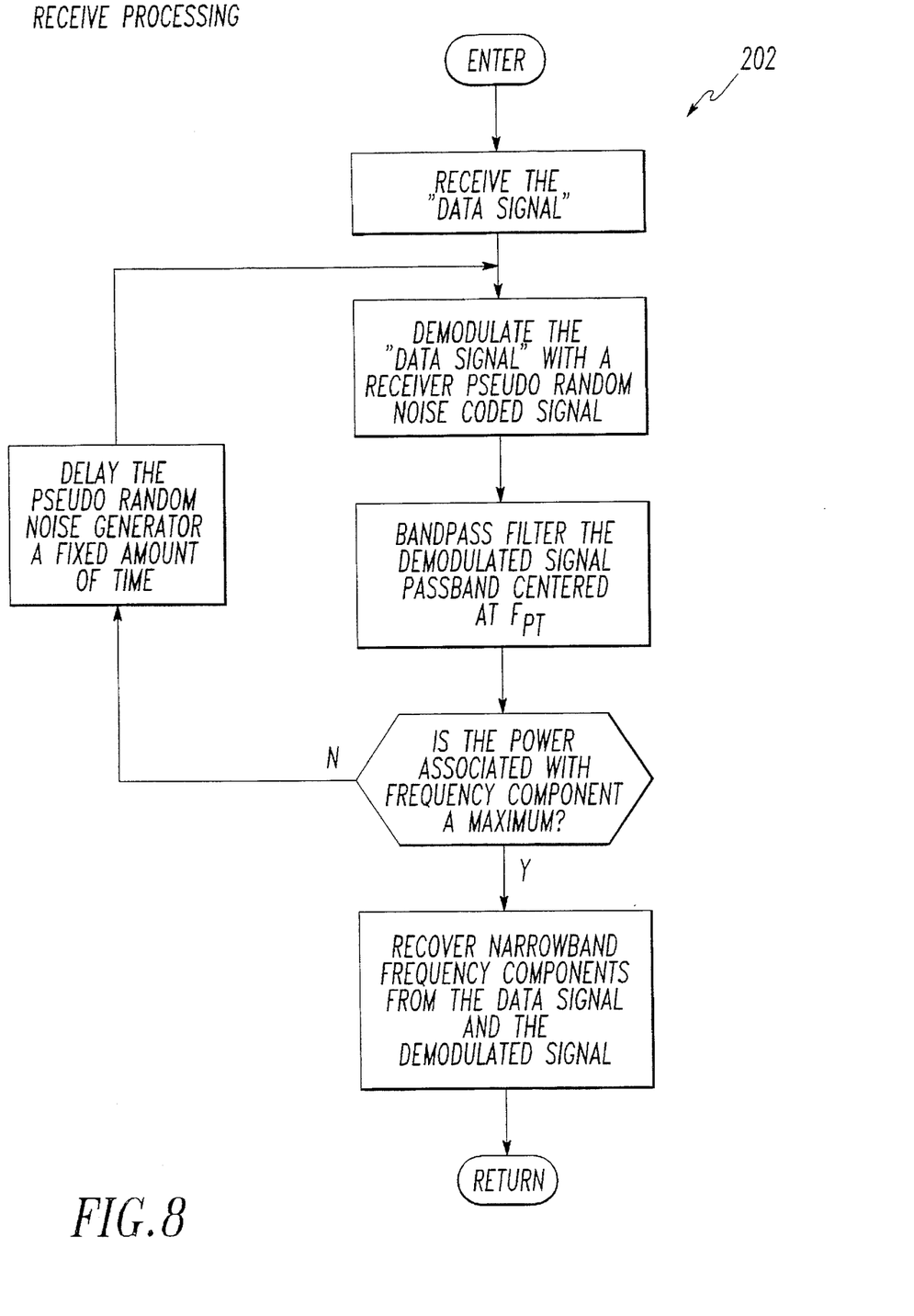
FIG. 8 is a flowchart diagram illustrating execution of the receiver signal processing functions disclosed in FIG. 5.

FIG. 7 illustrates a flow chart diagram 200 of the transmit processing resident in the transmitter memory and executable in the transmitter microprocessor. Similarly, FIG. 8 illustrates a flow chart diagram 202 of the receiver processing logic resident in receiver memory and executable in the receiver microprocessor of FIG. 6. Note, the logic illustrated in FIGS. 7 and 8 is substantially the same as the processing performed by the functional block diagrams of FIGS. 2 and 5 respectively. While the advantages of a discrete time system are well known, one of ordinary skill in the art will appreciate that the present invention may also be used in a continuous time domain communication system.

The foregoing changes and variations are merely a few examples of the underlying principle covered by the present invention. That is, according to the present invention, narrowband frequency components of information within a captured signal of bandwidth $F_{max}$ can be unambiguously transmitted over a datalink having a bandwidth less than $F_{max}$ by subdividing the captured signal into a plurality of subspectrums and bandshifting the subspectrums greater than the datalink bandwidth to baseband. Each bandshifted subspectrum is uniquely encoded using a different pilot tone which is detected by the receiver to decode the receive signal and unambiguously recover the narrowband frequency components.

Although the spectrum 42 (FIG. 3(A)) of the captured signal on the line 30 was divided into only two subspectrums ($S_1$ and $S_2$) in the interest of clarity, one of ordinary skill will certainly appreciate the spectrum 42 could have been divided into more than two subspectrums. Each subspectrum above the transmitter/receiver bandwidth (i.e., $F_{max}/2$) is then coded with a uniquely identifying pilot tone signal and bandshifted to baseband. Each bandshifted subspectrum is processed by the receiver using a plurality of pilot tone detectors to recover the narrowband frequency components within the subspectrum associated with each pilot tone. As an example, if the bandwidth of the signal to be transmitted is three times the bandwidth of the datalink, the signal can be evenly subdivided into three subspectrums $S_{10}$, $S_{11}$, $S_{12}$. Assuming subspectrums $S_{11}$, $S_{12}$ contain narrowband frequency components greater than the datalink bandwidth, unique pilot tone signals will be added to $S_{11}$, $S_{12}$ and both subspectrums bandshifted into the bandwidth of the datalink to create a composite signal which is transmitted to the receiver and processed.

The present invention does not violate Nyquist's criteria since narrowband frequency components within the spectrum of the captured signal, located at frequency values greater than the bandwidth of the datalink, are bandshifted into the datalink's bandwidth prior to transmission. The present invention trades off signal-to-noise ratio (SNR) for bandwidth. Therefore, an adequate SNR must exist in for the narrowband frequency components to be recovered in a system which employs the present invention.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

We claim:

1. A broadband communications system which transmits a sensed signal of bandwidth $F_{max}$ containing narrowband frequency components of information over a datalink having a bandwidth less than $F_{max}$, comprising:

a transmitter which receives said sensed signal, including means for subdividing the frequency spectrum of said sensed signal into a plurality of subspectrums, means for bandshifting each of said plurality of subspectrums containing frequency components greater than a bandwidth of said transmitter to baseband, means for encoding each of said bandshifted subspectrums, means for summing each of said plurality of subspectrums to create a data signal, and means for transmitting said data signal; and a receiver which receives said data signal, and processes said received data signal to recover the narrowband frequency components.

2. The broadband communications system of claim 1 wherein said means for bandshifting includes a bandpass filter which filters said sensed signal and provides a bandpassed signal indicative thereof;

means for mixing said bandpassed signal and a mixing signal to bandshift the bandpassed frequency spectrum to baseband and for providing a mixed signal indicative thereof; and a filter for attenuating sum frequency components within said mixed signal and for providing a difference signal indicative thereof.

3. The broadband communications system of claim 2 wherein said means for subdividing includes a plurality of filters.

4. The broadband communications system of claim 2 wherein said means for encoding includes means for generating and adding a pilot tone signal to said difference signal and for providing a summed signal indicative thereof;

means for generating a bi-polar pseudo random noise coded signal;

means for modulating said summed signal with said bi-polar pseudo random noise coded signal and for providing a modulated signal indicative thereof; and means for summing said modulated signal and said low passed sensed signal and for providing a data signal indicative of the sum.

5. The broadband communications system of claim 4 wherein said means for generating includes a shift register having a plurality of flip-flops arranged to provide said bi-polar pseudo random noise coded signal.

6. The broadband communications system of claim 5 wherein said means for generating further includes a clock source which provides a clock signal to said shift register, wherein the frequency value of said clock signal is less than $F_{max}$.

7. The broadband communications system of claim 4 further comprising a sonobuoy which contains said transmitter.

8. The broadband communications system of claim 4 wherein said means for transmitting includes an RF transmitter and an antenna.

9. The broadband communications system of claim 1 wherein said receiver includes decoding means synchronized in time with said means for encoding, for decoding said received data signal to recover narrowband frequency components.

10. A broadband communications system which transmits a data signal of bandwidth $F_{max}$ containing narrowband frequency components of information over a datalink having a bandwidth less than $F_{max}$, said system comprising:

A) a transmitter including i) a first low pass filter which filters a sensed signal and provides a low passed sensed signal indicative thereof;

ii) bandpass filter which filters said sensed signal and provides a bandpassed signal indicative thereof;

iii) means for mixing said bandpassed signal and a mixing signal to bandshift narrowband frequency components within the bandpassed frequency spectrum to baseband and for providing a mixed signal indicative thereof;

iv) a second low pass filter for attenuating sum frequency components within said mixed signal and for providing a bandpassed signal indicative thereof;

v) means for generating and adding a pilot tone signal to said bandshifted signal and for providing a summed signal indicative thereof;

vi) means for generating a transmitter bi-polar pseudo random noise coded signal;

vii) means for modulating said summed signal with said bi-polar pseudo random noise coded signal, and for providing a modulated signal indicative thereof;

viii) means for summing said modulated signal and said low passed sensed signal, and for providing a data signal indicative of the sum;

ix) means for transmitting said data signal; and

B) a receiver which receives said transmitted data signal and provides a received signal indicative thereof, and processes said received signal to recover the narrowband frequency components of information.

11. The broadband communications system of claim 10 wherein the break frequency of said first low pass filter is set at a frequency value no greater than the bandwidth of the data link.

12. The broadband communications system of claim 10 wherein said receiver includes means for generating a receiver bi-polar pseudo random noise coded signal of the same sequence as said transmitter bi-polar pseudo random noise coded signal;

means for synchronizing said receiver bi-polar pseudo random noise coded signal in time with said transmitter bi-polar pseudo random noise coded signal;

a demodulator which demodulates said receiver signal with said receiver bi-polar pseudo random noise coded signal, and provides a demodulator output signal; and means for recovering the narrowband frequency components of information within said received signal and said demodulator output signal.

13. The broadband communications system of claim 12 wherein said means for recovering includes means for performing fourier analysis.

14. A sonobuoy communications system which transmits a captured signal of bandwidth $F_{max}$ containing narrowband frequency components of sensed acoustic data over an RF datalink having a bandwidth less than $F_{max}$, said system comprising:

an RF transmitter which subdivides the frequency spectrum of said captured signal into a plurality of subspectrums, bandshifts each of said plurality of subspectrums containing narrowband frequency components greater than a bandwidth of said transmitter to baseband, encodes each of said bandshifted subspectrums and sums each of said plurality of subspectrums to create a data signal which is transmitted; and a receiver which receives said data signal and processes said received data signal to recover the narrowband frequency components.

15. A sonobuoy communications system of claim 14 wherein said RF transmitter includes a low pass filter which filters said captured signal and provides a low passed signal indicative thereof;

means for adding a unique pilot tone signal to each of said bandshifted subspectrums and for providing a summed signal for each;

means for uniquely encoding each of said summed signals and providing a unique encoded signal for each; and means for summing each of said encoded signals and said low passed signal, and for providing said data signal indicative thereof.

16. A method of transmitting a captured signal of bandwidth $F_{max}$ containing narrowband frequency components of sensed acoustic data over an RF datalink having a bandwidth less than $F_{max}$, comprising the steps of: subdividing the frequency spectrum of the captured signal into a plurality of subspectrums;

bandshifting each of said plurality of subspectrums containing frequency components greater than the bandwidth of the RF datalink;

encoding each of said bandshifted subspectrums, summing each of said plurality of subspectrums to create a data signal;

transmitting said data signal over an RF datalink to thereby create an RF data signal;

receiving said RF data signal and providing a received data signal indicative thereof; and signal processing said received data signal to recover the narrowband frequency components.

17. The method of claim 16, wherein the step of subdividing includes the steps of low pass filtering said captured signal and providing a low pass filtered signal indicative thereof; and bandpass filtering said captured signal and providing a bandpassed signal indicative thereof.

18. The method of claim 17 wherein the step of bandshifting includes the steps of mixing said bandpassed signal and a mixing signal to bandshift narrowband frequency components within the bandpassed frequency spectrum to baseband and providing a mixed signal indicative thereof;

signal processing to attenuate sum frequency components within said mixed signal and providing a bandpassed signal indicative thereof; and the step of encoding includes the steps of generating and adding a pilot tone signal to said bandshifted signal and providing a summed signal indicative thereof;

generating a transmitter bi-polar pseudo random noise coded signal; and modulating said summed signal with said bi-polar pseudo random noise coded signal and providing a modulated signal indicative thereof.

\* \* \* \* \*